United States Patent [19]

Maier et al.

[11] Patent Number: 4,964,299
[45] Date of Patent: Oct. 23, 1990

[54] APPARATUS FOR MEASURING, IN A TIRE TESTING MACHINE, RADIAL AND AXIAL FORCES AT A WHEEL CONSISTING OF A PNEUMATIC TIRE AND A RIM

[75] Inventors: Manfred Maier, Rossdorf; Franz Ruppert, Heppenheim; Joachim Schwab, Darmstadt, all of Fed. Rep. of Germany

[73] Assignee: Gebr. Hofmann GmbH & Co. KG, Fed. Rep. of Germany

[21] Appl. No.: 219,230

[22] Filed: Jul. 15, 1988

[30] Foreign Application Priority Data

Jul. 17, 1987 [DE] Fed. Rep. of Germany ....... 3723767

[51] Int. Cl.⁵ .......................................... G01M 17/02
[52] U.S. Cl. .................................... 73/146; 73/862.04
[58] Field of Search ................. 73/146, 7, 8, 9, 862.04

[56] References Cited

U.S. PATENT DOCUMENTS 3,867,838  2/1975  Gerresheim ........................ 73/146
3,969,933  7/1976  Himmler ............................ 73/146

FOREIGN PATENT DOCUMENTS 2610999  9/1977  Fed. Rep. of Germany ........ 73/146

*Primary Examiner*—Donald O. Woodiel
*Attorney, Agent, or Firm*—Cushman, Darby & Cushman

[57] ABSTRACT

An arrangement for measuring, in a tire testing machine, radial and axial forces at a wheel consisting of a pneumatic tire and a rim. The measuring axle, on which the wheel is rotatably disposed during the measuring run, has two cylindrical axle parts, of which the first, interior axle part is mounted so that it can be moved radially and frictionlessly in a straight line, and the second, exterior axle part, in axial direction, is frictionlessly located on the first axle part. For introduction of the axial forces, a first force measuring device is provided that is connected with a tension-compression rod that is rigidly connected with the second axle part, and for measuring the radial forces, a second force measuring device is connected between the base plate and the first axle part.

12 Claims, 4 Drawing Sheets

APPARATUS FOR MEASURING, IN A TIRE TESTING MACHINE, RADIAL AND AXIAL FORCES AT A WHEEL CONSISTING OF A PNEUMATIC TIRE AND A RIM

BACKGROUND OF THE INVENTION

The invention relates to an apparatus for measuring, in a tire testing machine, radial and axial forces at a wheel consisting of a pneumatic tire and a rim.

More particularly, an apparatus is provided wherein the pneumatic tire rolls, during the measuring run, on a roll-off base, particularly a testing drum. This apparatus also has a measuring axle on which the wheel is rotatably mounted during the measuring run, and force measuring devices for measuring the radial and axial forces.

In order to determine the wear, the stability under load and the fatigue strength of vehicle tires, vehicle tires must be tested on corresponding tire testing machines under the same or even under more extreme conditions than those existing when the tire is on the vehicle. By means of the tire testing machine, all load possibilities must be simulated. In this case, the tire is subjected to radial and axial loads, at a variable inflation pressure and at a variable driving speed. The purpose is to determine, during the test run, the radial and axial forces that occur at the tire.

As the roll-off base, which serves for simulating the road, a continuous belt that is guided via pulleys may be used, or a testing drum, such as it is known from *Automobile-Industrie*, 2/71, Pages 85 to 90. Also known are measuring devices, particularly in the form of so-called dynamo hubs, which are arranged in the area of the motor vehicle axle or also of a measuring axle at the tire testing machine (Published German Patent Application Nos. 21 04 003 and 22 14 256). In the case of these dynamo hubs, which require high manufacturing costs, several strain gauge bridge circuits are used in order to determine radial and axial forces as well as moments that occur during the measuring run.

SUMMARY OF THE INVENTION

It is the object of the invention to provide a measuring device that is constructed of simple structural elements and by means of which the axial and the radial forces are not mutually superimposed during the measuring.

This object is achieved according to the invention by providing a measuring axle, on which the rim with the tire is rotatably mounted during the measuring run, having two cylindrical axle parts. The first interior axle part, which may be constructed as a hollow-cylindrical axle stub, is disposed at a base plate so that it can be moved frictionlessly in a straight the radial direction. The second exterior cylindrical axle part is disposed frictionlessly in axial direction on the first axle part. For this purpose, a cylindrical space may be formed between the two cylindrical axle parts that are fitted into one another, this space being filled by balls or rolls. The balls or rolls have the same diameter as the thickness of this cylindrical space. The balls or rolls, in this case, may be held in a ball cage or roll cage which has a corresponding cylindrical shape.

The axial forces as well as the radial forces are clearly separated from one another and are supplied to a respectively assigned measuring device. The measuring devices or load cells may have a simple construction, and inexpensive weighing cells may also be used for this purpose.

For the introduction of the axial forces into the first force measuring device, a flexible tension-compression rod is provided that extends along the wheel axle in the interior of the first axle part, this tension-compression rod being rigidly connected in axial direction with the second axle part. By means of the flexible construction of the tension-compression rod, it is ensured that only tension-compression forces, i.e., axial forces, are introduced into the force measuring device. Misalignments are compensated by the flexible construction of the tension-compression rod and moments are not introduced into the force measuring device. As mentioned above, it is therefore possible to use an inexpensive weighing cell for the force measuring device.

For detecting the radial forces, a second force measuring device is connected between the base plate and the first axle part in the direction of movement of the first axle part. This force measuring device may also be constructed as a simple weighing cell. The second force measuring device, free from play, particularly by means of prestressing, is adjusted with respect to the first axle part so that there is no occurrence of alternating loads. In this manner, a direct measuring of the radial forces is achieved, in contrast to a tire testing machine that is known from German Published Patent Application No. 23 20 322, in which the radial force is measured indirectly by means of a force measuring device connected between the moving drum and its base.

In order to obtain a compact arrangement, the second exterior axle part may be fastened at an end of the tension-compression rod that projects out of the first axle part. The other end of the tension-compression rod is connected with the first force measuring device. This force measuring device may be housed in a housing part that is constructed in one piece with the measuring axle body. The second force measuring device, for receiving the radial forces, may be supported against this housing part free from play.

For this purpose, the measuring axle body preferably forms a parallel oscillator which can be achieved by means of correspondingly developed springs, particularly flat support springs, by means of which the measuring axle body is supported against the base plate.

For the mounting of the wheel on the measuring axle, a flange sleeve may be rotatably mounted on the second exterior axle part. At this flange sleeve, the rim can be fastened on which the tire to be tested is mounted. The flange sleeve, however, may also be a measuring rim that is integrated into the testing machine and has a jaw opening that, if necessary, can be adjusted to different tire sizes.

As a result of the compact construction, it is possible to arrange around a roll-off base, that is developed as a testing drum, several measuring axles with assigned force measuring devices for axial and radial forces.

By means of the invention, a measuring arrangement is achieved that has a compact construction in which, instead of the complicated multi-component dynamo hubs, simple force measuring devices can be used, which may be constructed as commercially available standard single-component or two-component load cells, particularly as weighing cells. As a result, the functional capacity of a measuring device can be reached that up to now had required a multi-component dynamo hub.

Other objects, features, and characteristics of the present invention, as well as the method of operation and functions of the related elements of the structure, and the combination of parts and economies of manufacture, will become more apparent upon consideration of the the following detailed description and the appended claims with reference to the accompanying drawings all of which form a part of this specification, wherein like reference numeral designate corresponding parts in the various figures.

DETAILED DESCRIPTION OF THE PRESENTLY PREFERRED EXEMPLARY EMBODIMENT

Figure 1:
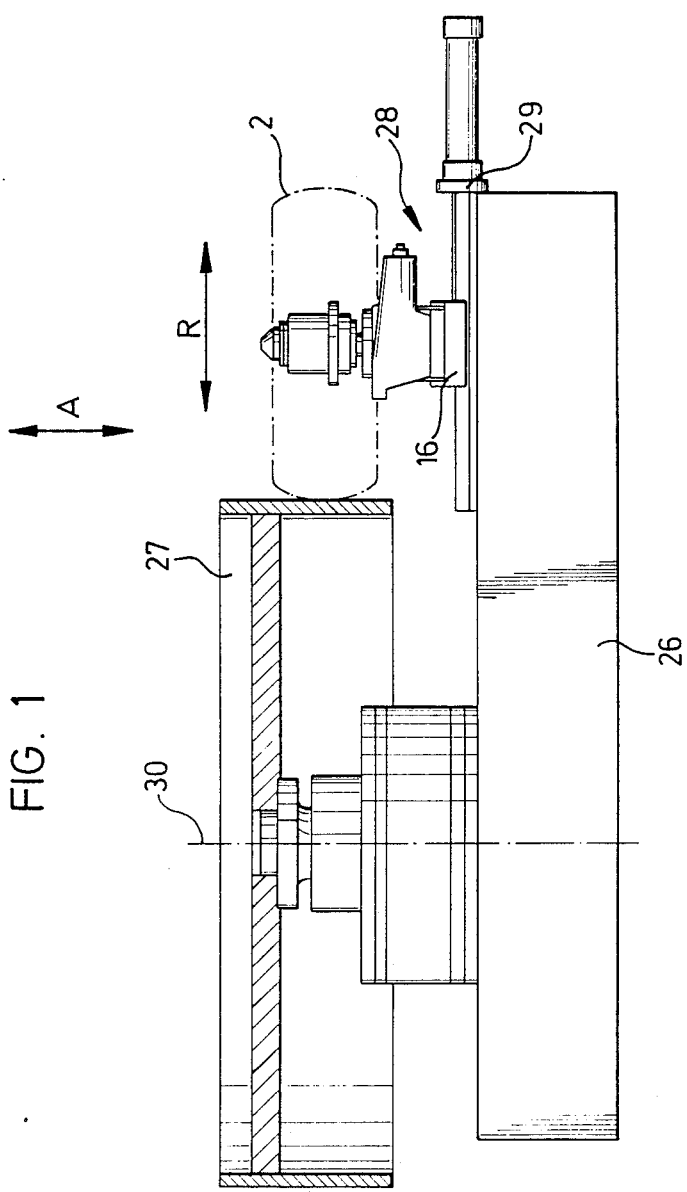
FIG. 1 is a diagrammatic representation of a testing machine with a measuring arrangement for measuring radial and axial forces which is an embodiment of the invention.
Figure 2:
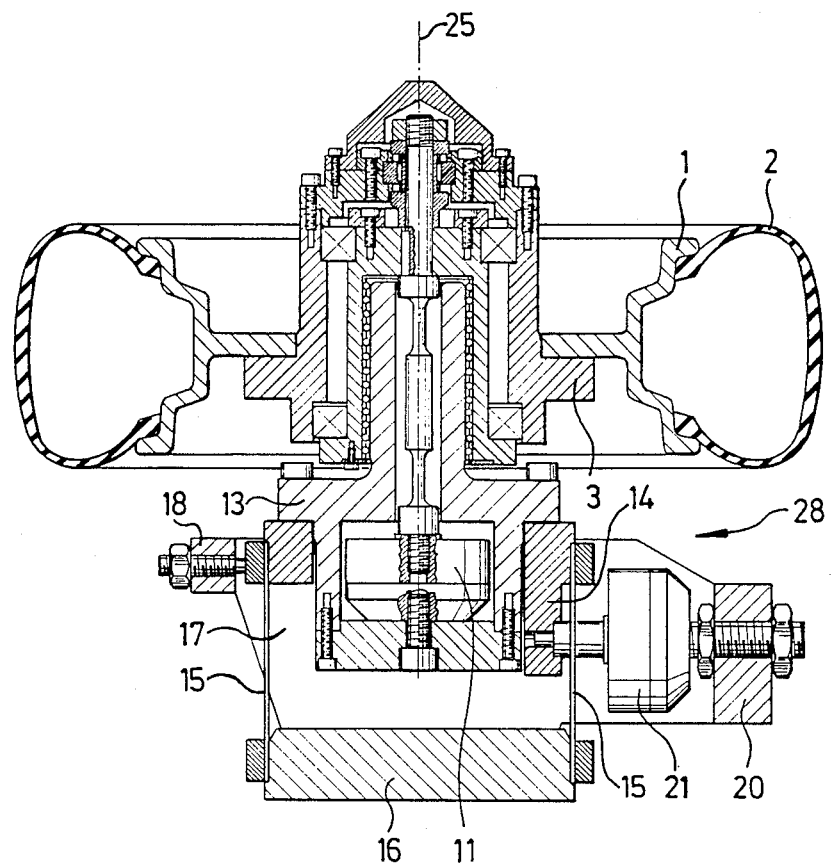
FIG. 2 is a sectional representation of the measuring arrangement of FIG. 1.

In the tire testing machine shown in FIG. 1, a testing drum 27 is used that can be rotated around an axle 30 and is disposed at the same supporting structure 26 as the measuring device 28 for measuring the radial forces (Arrow R) and axial forces (Arrow A). Several, for example, six, measuring devices may also distributed around the circumference of the testing drum 27. For this purpose, the measuring device 28, with a base plate 16, is disposed in a device 29 for the adjusting of the wheel toe and of the steering angle that is supported at the supporting structure 26. In the case of the measuring device shown in FIG. 2, a tire 2 to be tested is fitted on a rim 1. The rim 2 is fastened at a flange sleeve 3. The flange sleeve 3, in radial direction, via roller bearings 4 and 5, is disposed at a hollow cylindrical axle part that is constructed as a stationary inner sleeve 7. In axial direction, the rotating flange sleeve 3, by means of an additional roller bearing 6, is connected with the stationary inner sleeve 7. The roller bearing 6, in radial direction, toward the outside, is secured by means of a supporting screw 29. The supporting screw 29 is screwed onto one end of a tension-compression rod 12.

Figure 3:
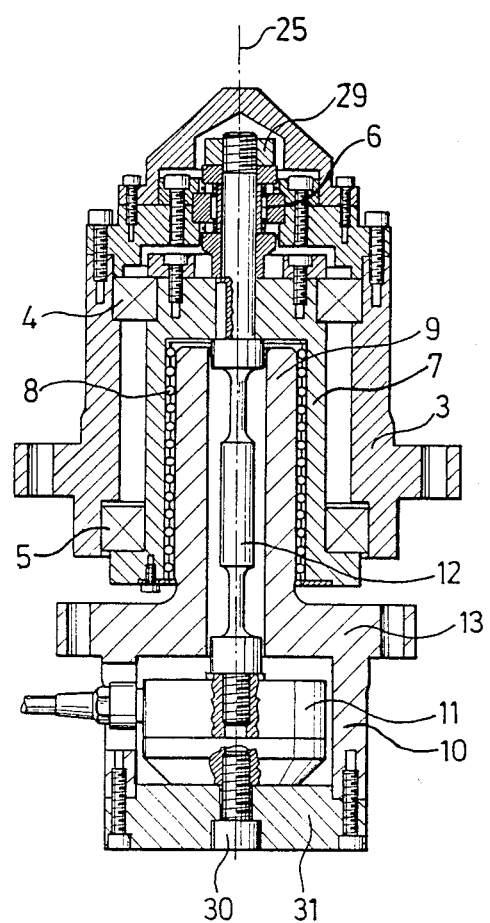
FIG. 3 is a view of the construction of the measuring axle used in the measuring arrangement of FIG. 1, with the assigned force measuring device for the axial forces.

The tension-compression rod 12 is located in the wheel axle 25 and in the interior of a hollow cylindrical axle part which is formed as an axle stub 9 at the measuring axle body 13. The tension-compression rod 12 consists of a flexible material so that only axial forces are introduced into a force measuring device 11 arranged at its other end. The force measuring device 11 is located in a housing part 10 (FIG. 2 and 3) that is molded onto the measuring axle body 13, and is screwed onto the end of the tension-compression rod 12 which projects into the housing part 10. By means of a fastening screw 30, the load cell 11 is fastened at a bottom 31 that is screwed to the housing part 10.

Between the interior axle part or the axle stub 9 and the coaxially arranged axle Part (stationary interior sleeve 7), a hollow cylindrical space is provided that is filled by the balls of a ball cage 8. The balls have the same diameter as the thickness of the hollow cylindrical space. By means of the balls of the ball cage 8, a frictionless mounting of the stationary inner sleeve on the axle stub 9 is ensured.

The inner sleeve 7 is, in axial direction, rigidly connected with the end of the tension-compression rod 12 that projects out of the axle stub 9. In the illustrated embodiment, the stationary inner sleeve 7 is also, in a torsionally fixed manner, connected with the tension-compression rod 12.

During the measuring run, generated axial forces (Arrow A) are transmitted from the inner sleeve 7 to the tension-compression rod 12. The tension-compression rod 12 introduces these axial forces into the force measuring device 11 which may be constructed as a weighing cell.

Figure 4:
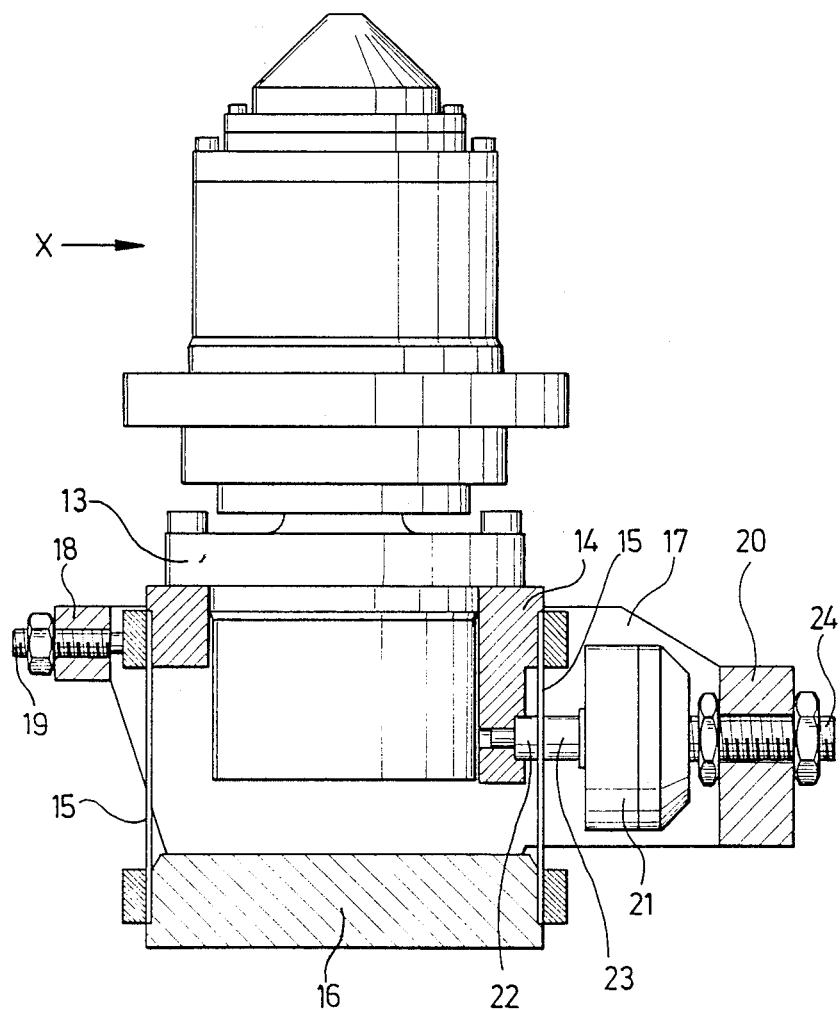
FIG. 4 is a view of the measuring axle with the assigned force measuring device for the radial forces.

For the measuring of the radial forces, a second force measuring device 21 is provided (FIG. 4). By means of a supporting screw 24, the force measuring device 21, free from play or under prestress, is supported against a housing 14 that is fastened at the measuring axle body 13. In the direction of an Arrow X, the housing 14, by means of a pressure mushroom 22, is pressed against a load head 23 of the measuring device 21. The housing 14, via two flat supporting springs 15, is supported against the base plate 16. One flat supporting spring 15 may also be replaced by two bar springs. As a result, the measuring axle body 13, that is fastened at the housing 14, in the manner of a parallel oscillator, is disposed at the base plate 16 in a frictionless way. As shown in FIG. 1, the base plate 16 is supported at the substructure 26 via device 29, the testing drum 27 also being rotatably mounted at this substructure 26.

The base plate 16 also has two side walls 17, of which one side wall is shown. At these side walls, a stop bar 18 having an adjusting screw 19 is provided as well as a fastening bar 20 having the supporting screw 24. In this case, the stop bar 18 not only has the function of limiting the deflection of the housing 14 that is mounted in the manner of a parallel oscillator, but also provides such a prestressing for the housing 14 and the load cell 21 with respect to one another that there is no occurrence of alternating loads.

By means of the indicated measuring arrangement, it is ensured that only axial forces are introduced into the first force measuring device 11 and only radial forces are introduced into the second force measuring device 21. The measuring sensitivities of the two load cells 11 and 21 are correspondingly installed in the axial direction and in the radial direction in which the housing 14 is mounted as a parallel oscillator.

We claim:

1. An apparatus for measuring, in a tire testing machine, the radial and axial forces at a wheel consisting of a pneumatic tire mounted to a rim, the testing machine including a roll-off base upon which the pneumatic tire rolls during the measuring run, a measuring axle on which the wheel is rotatably mounted during the measuring run and force measuring devices for the radial and axial forces, the apparatus comprising:

a measuring axle having first and second cylindrical axle parts, including a first, interior axle part coupled to a base plate so as to be movable in a straight line, radially to relative to said roll-off base, in a frictionless manner, and a second, exterior axle part frictionlessly axially mounted on said first axle part;

a flexible tension-compression rod extending along an axis of the wheel to be tested and rigidly connected with the second axle part in the axial direction for the introduction of axial forces into a first force measuring device supported at the first axle part; and a second force measuring device connected between the base plate and said first axle part for measuring radial forces in the moving direction direction of said first axle part.

2. An apparatus according to claim 1, characterized in balls or rolls are provided between the first axle part and the second axle part.

3. An apparatus according to claim 1, wherein, between the first axle part and the second axle part, a cylindrical space exists that is filled with balls or rolls.

4. An apparatus according to claim 1, wherein the second axle part is connected with the tension-compression rod in a torsionally fixed manner.

5. An apparatus according to claim 1, wherein, at one end of the tension-compression rod projecting out of the first axle part, the second axle part is fastened, and at the other end of the tension-compression rod, the first force measuring device is located.

6. An apparatus according to claim 1, wherein the wheel can be fastened on a flange sleeve that is rotatably disposed at the second axle part.

7. An apparatus according to claim 1, wherein the flange sleeve radially and axially is supported at the second axle part via roller bearings.

8. An apparatus according to claim 1, wherein a mounting device for the first axle part at the base plate is constructed as a parallel oscillator.

9. An apparatus according to claim 8, wherein the first axle part is mounted at the base plate by means of two flat supporting springs.

10. An apparatus according to claim 1, wherein the second measuring device is held with respect to a mounting device for the first axle part free from play and under prestress.

11. An apparatus according to claim 1, wherein the measuring axle is supported at the same substructure as the roll-off base.

12. An apparatus according to claim 1, wherein several measuring axles with assigned first and second measuring devices are arranged in circumferential direction around the roll-off base constructed as a testing drum.

* * * * *